US009185644B2

(12) United States Patent
Mizutani

(10) Patent No.: US 9,185,644 B2
(45) Date of Patent: Nov. 10, 2015

(54) TERMINAL DEVICE IDENTIFYING TARGET ACCESS POINT FROM AMONG A PLURALITY OF ACCESS POINTS

(75) Inventor: Norio Mizutani, Mie (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 152 days.

(21) Appl. No.: 13/598,088

(22) Filed: Aug. 29, 2012

(65) Prior Publication Data

US 2013/0077568 A1    Mar. 28, 2013

(30) Foreign Application Priority Data

Sep. 26, 2011  (JP) .................................. 2011-208785

(51) Int. Cl.
*H04W 48/20* (2009.01)
*H04W 36/00* (2009.01)

(52) U.S. Cl.
CPC .......... *H04W 48/20* (2013.01); *H04W 36/0083* (2013.01)

(58) Field of Classification Search
CPC ..... H04W 80/04; H04W 84/12; H04W 88/06; H04W 88/08; H04W 84/18; H04W 36/245; H04W 52/0258; H04W 88/02; H04W 88/04; H04W 48/20; H04W 36/0083
See application file for complete search history.

(56) References Cited

U.S. PATENT DOCUMENTS

| | | | |
|---|---|---|---|
| 7,079,842 B2 | 7/2006 | Nagai | |
| 7,899,013 B2 | 3/2011 | Yokoyama | |
| 2003/0137954 A1* | 7/2003 | Yokoyama | 370/331 |
| 2004/0167974 A1* | 8/2004 | Bunn et al. | 709/223 |
| 2004/0185851 A1 | 9/2004 | Nagai | |
| 2007/0275701 A1* | 11/2007 | Jonker | 455/414.1 |
| 2008/0052384 A1* | 2/2008 | Marl et al. | 709/223 |
| 2010/0238491 A1* | 9/2010 | Shiimori et al. | 358/1.15 |
| 2011/0193973 A1* | 8/2011 | Motoki et al. | 348/207.1 |
| 2011/0294504 A1* | 12/2011 | Hara et al. | 455/434 |

FOREIGN PATENT DOCUMENTS

| | | |
|---|---|---|
| JP | 2002-264431 A | 9/2002 |
| JP | 2002-345027 A | 11/2002 |
| JP | 2003-216350 A | 7/2003 |
| JP | 2004-072599 A | 3/2004 |
| JP | 2004-072608 A | 3/2004 |
| JP | 2004-289226 A | 10/2004 |
| JP | 2004-328272 A | 11/2004 |
| JP | 2005-044024 A | 2/2005 |
| JP | 2005-349617 A | 12/2005 |
| JP | 2007-157077 A | 6/2007 |
| JP | 2007-306510 A | 11/2007 |

\* cited by examiner

*Primary Examiner* — Andrew Lai
*Assistant Examiner* — M Mostazir Rahman
(74) *Attorney, Agent, or Firm* — Scully, Scott, Murphy & Presser, P.C.

(57) ABSTRACT

A terminal device includes a communication unit, and a first identifying unit. The communication unit is configured to wirelessly communicate with a plurality of access points, receive an output signal from each of the plurality of access points, and send an instruction to an image processing device through one of the plurality of access points. The first identifying unit is configured to identify, from among the plurality of access points, at least one accessible access point from which the communication unit is currently capable of receiving the outputted signal, and identify a target access point through which the communication unit most recently has sent the instruction to the image processing device from among the at least one accessible access point. The communication unit connects to the target access point.

11 Claims, 12 Drawing Sheets

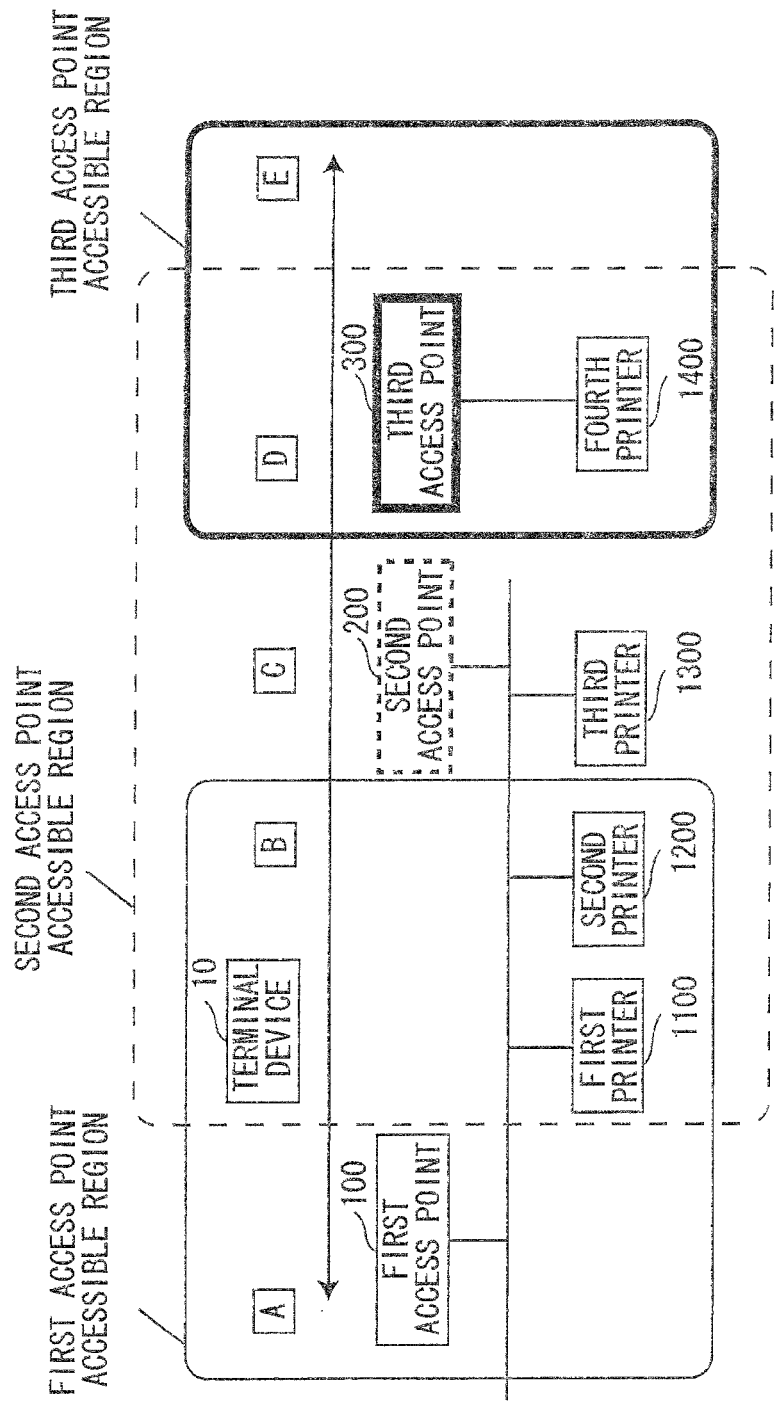

FIG. 2(B)

| POSITION | ACCESSIBLE ACCESS POINT | OPERABLE PRINTER |
|---|---|---|
| A | FIRST ACCESS POINT | FIRST PRINTER, SECOND PRINTER, THIRD PRINTER |
| B | FIRST ACCESS POINT | FIRST PRINTER, SECOND PRINTER, THIRD PRINTER |
| B | SECOND ACCESS POINT | FIRST PRINTER, SECOND PRINTER, THIRD PRINTER |
| C | SECOND ACCESS POINT | FIRST PRINTER, SECOND PRINTER, THIRD PRINTER |
| D | SECOND ACCESS POINT | FIRST PRINTER, SECOND PRINTER, THIRD PRINTER |
| D | THIRD ACCESS POINT | FOURTH PRINTER |
| E | THIRD ACCESS POINT | FOURTH PRINTER |

| ACCESS POINT | USED PRINTER | TIME AND DATE FOR LAST PRINT |
|---|---|---|
| FIRST ACCESS POINT | FIRST PRINTER | 2011/01/01 14:00 |
| FIRST ACCESS POINT | SECOND PRINTER | 2011/01/01 12:00 |
| SECOND ACCESS POINT | FIRST PRINTER | 2011/01/01 10:00 |
| SECOND ACCESS POINT | SECOND PRINTER | 2011/01/01 18:00 |
| SECOND ACCESS POINT | THIRD PRINTER | 2011/01/01 20:00 |
| THIRD ACCESS POINT | FOURTH PRINTER | 2011/01/01 22:00 |

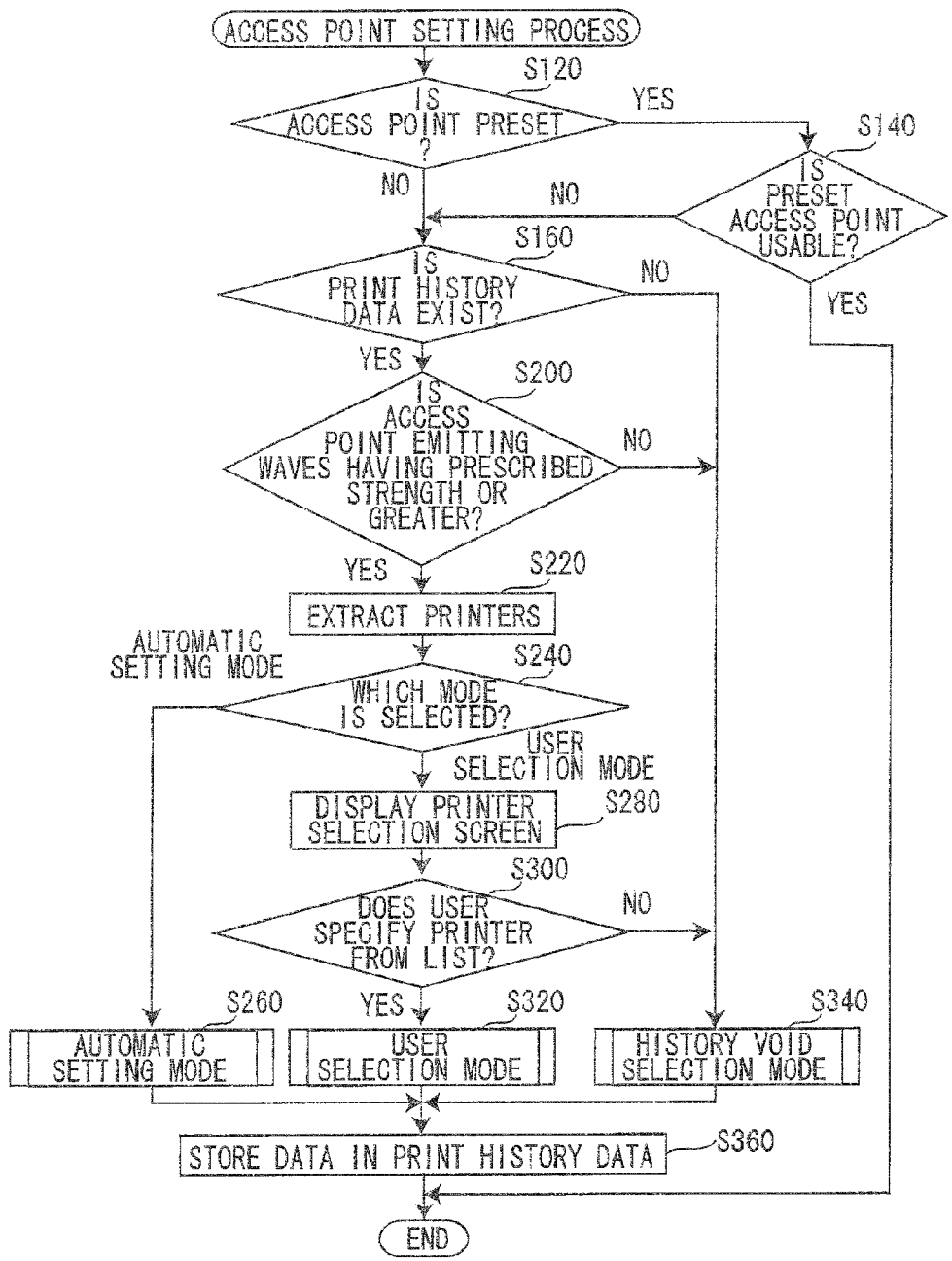

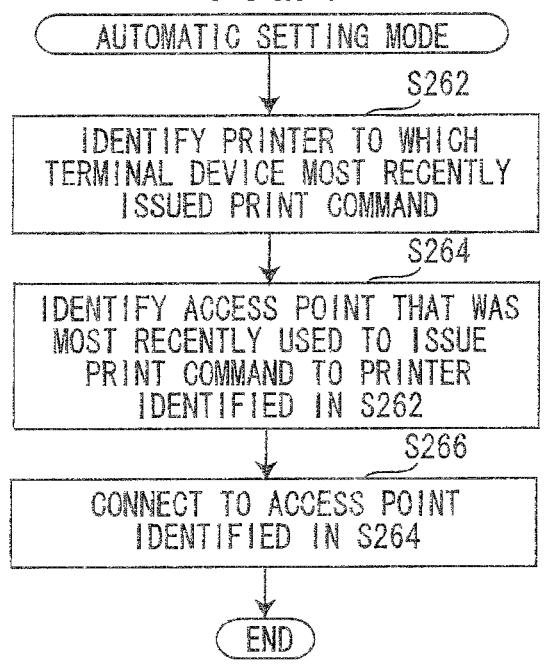

| ACCESS POINT | USED PRINTER | TIME AND DATE FOR LAST PRINT |
|---|---|---|
| FIRST ACCESS POINT | FIRST PRINTER | 2011/01/01 14:00 |
| | SECOND PRINTER | 2011/01/01 12:00 |
| SECOND ACCESS POINT | FIRST PRINTER | 2011/01/01 10:00 |
| | SECOND PRINTER | 2011/01/01 18:00 |
| | THIRD PRINTER | 2011/01/01 20:00 |

THIRD PRINTER THAT WAS MOST RECENTLY USED
(THAT WAS INSTRUCTED AT
LATEST TIME AND DATE)
IS SELECTED

↓

SECOND ACCESS POINT THAT WAS MOST RECENTLY
USED TO ISSUE PRINT COMMAND TO
THIRD PRINTER IS SELECTED

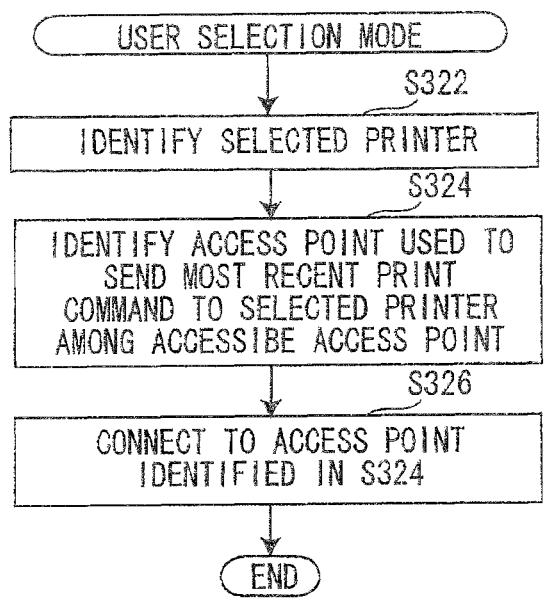

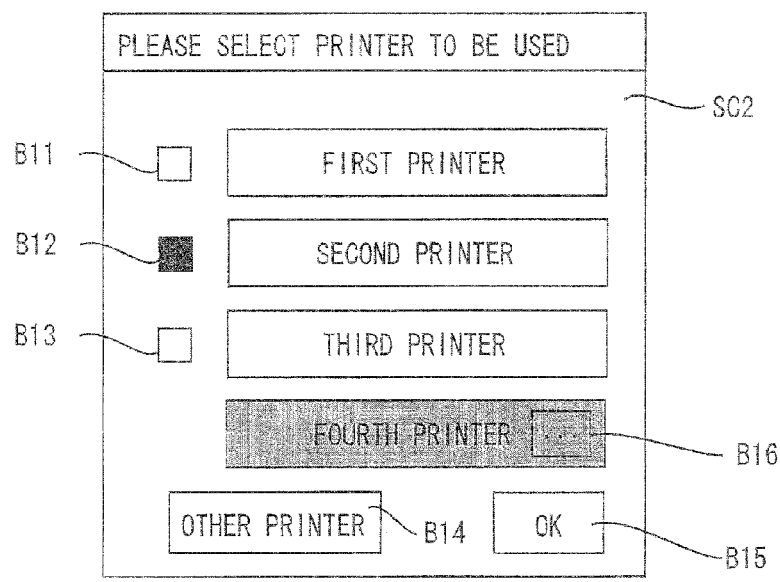

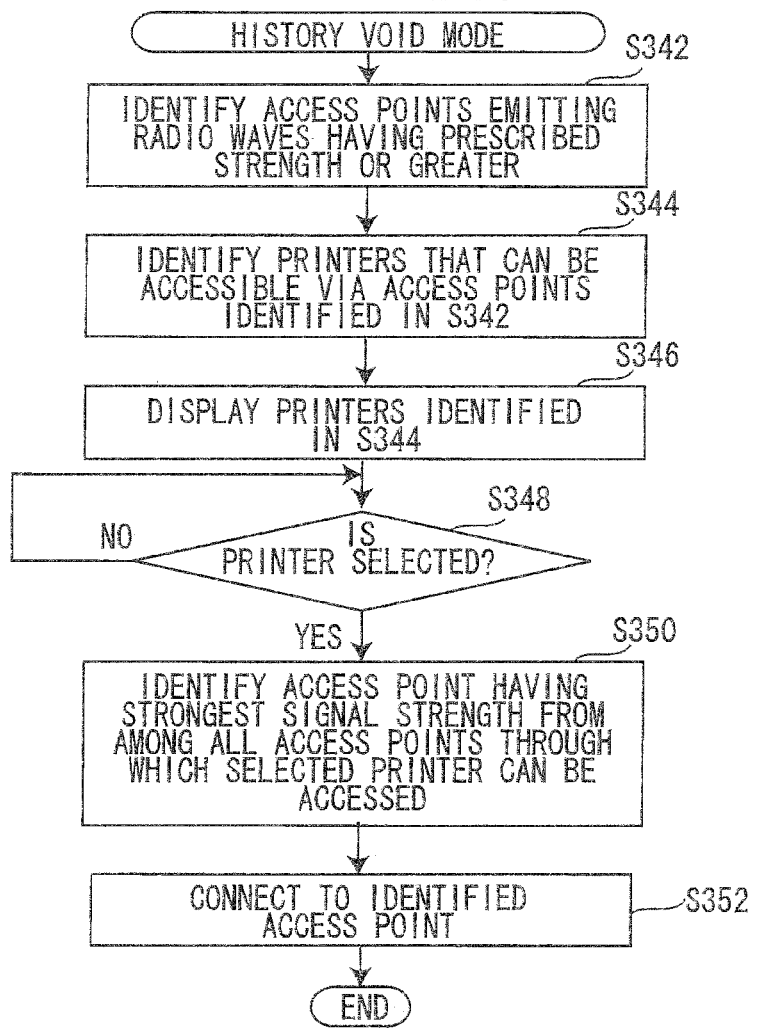

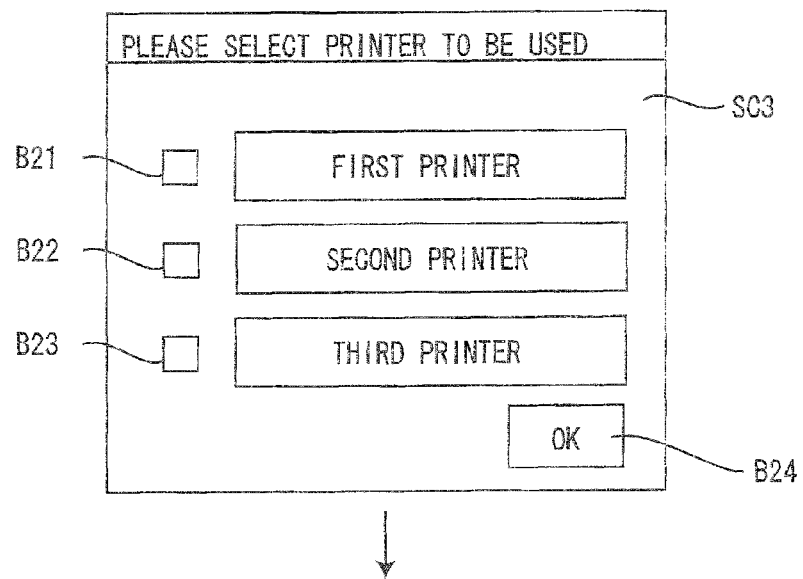

_US 9,185,644 B2_

TERMINAL DEVICE IDENTIFYING TARGET ACCESS POINT FROM AMONG A PLURALITY OF ACCESS POINTS

CROSS REFERENCE TO RELATED APPLICATION

This application claims priority from Japanese Patent Application No. 2011-208785 filed Sep. 26, 2011. The entire content of the priority application is incorporated herein by reference.

TECHNICAL FIELD

The present invention relates to a terminal device that issues a command to an image processor through an access point to execute an image process.

BACKGROUND

When using a wireless network, normally a terminal device on the network transmits the command for executing an image process to an image processor via a wireless base station called an access point. The terminal device can issue a command to execute an image process via the access point to an image processor when the terminal device is located within sufficient range of the access point to receive radio waves emitted therefrom.

Since wireless communications are interrupted when a terminal device moves from a first position within communication range of the access point to a second position outside this communication range, some conventional terminal devices possess a technology to detect and connect to another access point (referred to as a handover) when it is necessary to change access points in order to continue wireless communications. One conventional terminal device includes a history table storing information on the number of times the terminal device has connected to access points in the past. When a handover is required, the terminal device references this history table and determines an access point for the handover by sequentially attempting to connect to access points in order from those with which the terminal device has had the most connections.

SUMMARY

However, when the conventional terminal device determines an access point for the handover based on the numbers of past connections, the terminal device does not always connect to the access point that the user prefers.

To resolve this issue, it is an object of the present invention to provide a terminal device capable of using appropriate access points for wireless communications.

In order to attain the above and other objects, the invention provides a terminal device. The terminal device includes a communication unit, and a first identifying unit. The communication unit is configured to wirelessly communicate with a plurality of access points, receive an output signal from each of the plurality of access points, and send an instruction to an image processing device through one of the plurality of access points. The first identifying unit is configured to identify, from among the plurality of access points, at least one accessible access point from which the communication unit is currently capable of receiving the outputted signal, and identity target access point through which the communication unit most recently has sent the instruction to the image processing device from among the at least one accessible access point. The communication unit connects to the target access point.

According to another aspect, the present invention provides a non-transitory computer readable storage medium storing a set of program instructions installed on and executed by a computer having a communication unit configured to wirelessly communicate with a plurality of access points, receive an output signal from each of the plurality of access points, and send an instruction to an image processing device through one of the plurality of access points. The program instructions includes identifying, from among the plurality of access points, at least one accessible access point from which the communication unit is currently capable of receiving the outputted signal; and identifying a target access point through which the communication unit most recently has sent the instruction to the image processing device from among the at least one accessible access point.

BRIEF DESCRIPTION OF THE DRAWINGS

The particular features and advantages of the invention as well as other objects will become apparent from the following description taken in connection with the accompanying drawings, in which:

FIGS. 2(A) and 2(B) are explanatory diagrams illustrating an operating environment of a terminal device, various access points, and various printers;

FIG. 3 is an explanatory diagram illustrating an example of print history data stored in a record table;

FIG. 4 is a flowchart illustrating steps in a access point setting process;

FIG. 7 is a flowchart illustrating steps in an automatic setting mode process;

FIG. 8 is an explanatory diagram illustrating a method to identify an access point in the automatic setting mode;

FIG. 9 is a flowchart illustrating steps in a user selection mode process;

FIG. 10(A) is an explanatory diagram illustrating a printer selection screen in the user selection mode;

FIG. 10(B) is an explanatory diagram illustrating an example of print history data stored in a record table;

FIG. 11 is a flowchart illustrating steps in a history void mode process; and FIG. 12(A) is an explanatory diagram illustrating a method to identify an access point in the history void mode; and FIG. 12(B) is an explanatory diagram illustrating a printer selection screen in the history void mode.

DETAILED DESCRIPTION

A. Embodiment

A-1. Configuration of a Wireless System

Figure 1:
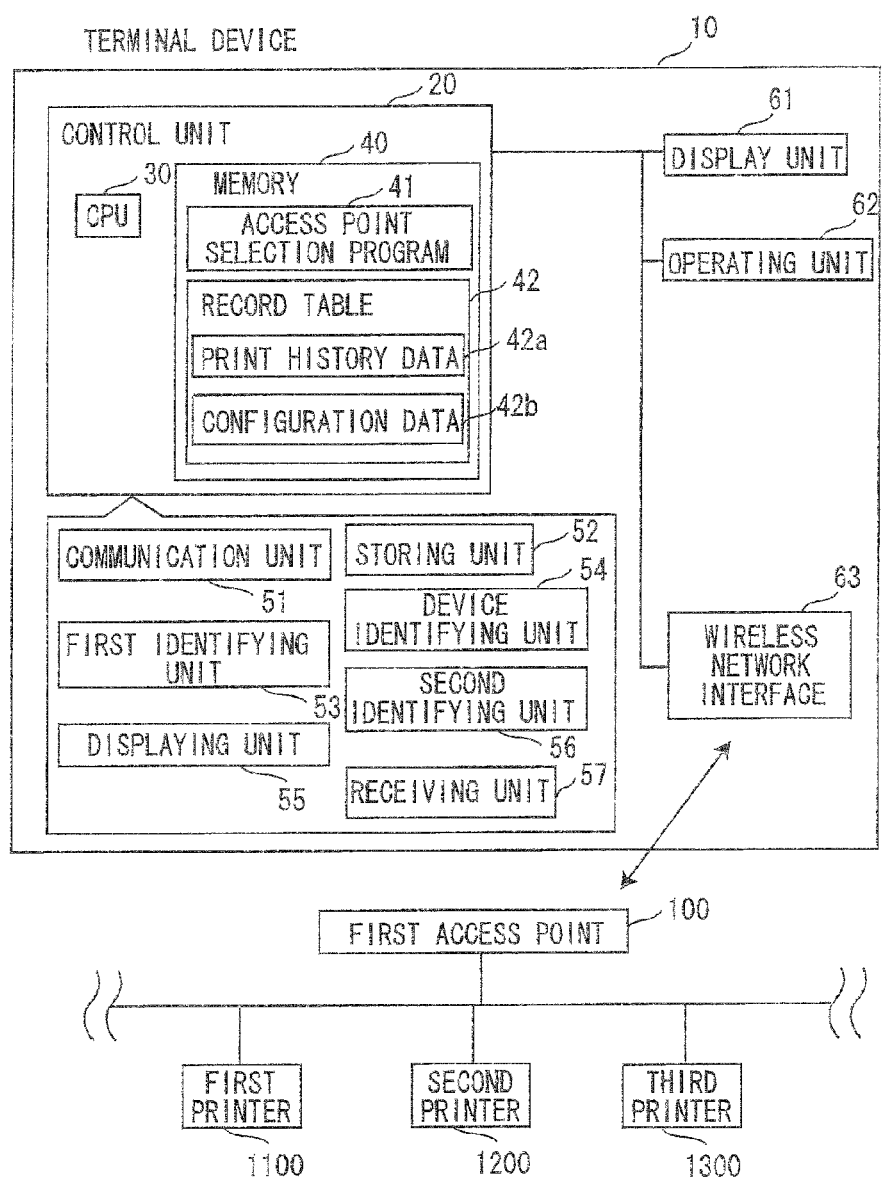
FIG. 1 is a block diagram showing a structure of a communication system according to an embodiment of a present invention.

FIG. 1 is a block diagram showing the structure of a communication system according to an embodiment of the present invention. As shown in FIG. 1, the communication system includes a terminal device 10 (a mobile telephone or a personal digital assistant (PDA), for example), a first access point 100, a first printer 1100, a second printer 1200, and a third printer 1300. The terminal device 10 can instruct any of the printers 1100, 1200, and 1300 to execute an image process by transmitting a command via the first access point 100 using Wi-Fi communication technology. Wi-Fi is defined by the Wi-Fi Alliance as a wireless communication method based on the IEEE 802.11 standards. In the embodiment, it will be assumed that the image process is a printing process.

Note that the terminal device 10 according to the embodiment described below can transmit an instruction to execute an image process via the first access point 100 to one of three printers, but the number of printers available to the terminal device 10 can be adjusted to any number that the access point can support.

A-1-1. Structure of the Terminal Device

Next, the structure of the terminal device 10 according to the embodiment will be described with reference to FIG. 1.

The terminal device 10 includes a control unit 20, a display unit 61, an operating unit 62, and a wireless network interface 63, all of which components are connected via a bus line.

The control unit 20 includes a CPU 30, and memory 40. The CPU 30 executes a process based on an access point selection program 41 stored in the memory 40. When executing a process according to the access point selection program 41, the CPU 30 implements the functions of a communication unit 51, a storing unit 52, a first identifying unit 53, an identifying unit 54, a displaying unit 55, a second identifying unit 56, and a detecting unit 57.

The memory 40 stores the access point selection program 41 mentioned above, and a record table 42. The record table 42 includes print history data 42a and configuration data 42b described later. The memory 40 includes one or a plurality of storage media, such as ROM, RAM, a hard disk, and the like.

The display unit 61 displays various information on its screen in response to instructions from the control unit 20. By operating the operating unit 62, the user can select an item displayed in the display unit 61. The display unit 61 may be configured of a touchscreen, in which case the display unit 61 also functions as the operating unit 62. Thus, the user can select an item displayed on the screen of the display unit 61 by touching the screen in a region corresponding to the item.

The wireless network interface 63 receives radio waves transmitted from an access point and also transmits radio waves. The control unit 20 identifies the strength of the radio waves (hereinafter referred to as "signal strength") received via the wireless network interface 63 and judges that the access point is accessible when the signal strength exceeds a prescribed value.

The control unit 20 can transmit instructions via the accessible first access point 100 to perform a printing process on one of the printers 1100, 1200, and 1300.

A-1-2. Relationships between Access Points and Printers

The following is a description of the relationships between access points that a terminal device can use and printers that can receive instructions to perform printing jobs via the access points. FIGS. 2(A) and 2(B) illustrate the operating environment of the terminal device 10, various access points, and various printers. Note that the communication system shown in FIG. 1 is based on the premise that the terminal device 10 is present at position A in FIG. 2.

As shown in FIG. 2(A), the communication system further includes a second access point, a third access point 300 and a fourth printer 1400. As described later, the terminal device 10 at one of the points B and C can instruct one of the printer 1100, 1200, and 1300 to execute an image process by transmitting a command via the second access point 200 using Wi-Fi communication technology. The terminal device 10 at one of the points D and E can instruct the printer 1400 to execute an image process by transmitting a command via the third access point 300 using Wi-Fi communication technology.

First, access points available to the terminal device 10 will be described. Access points broadcast radio waves in their peripheral area at a specific frequency for wireless communications. The terminal device 10 measures the strength of a signal received via the wireless network interface 63 to determine whether the access point is accessible. Specifically, the terminal device 10 identifies access points from which received radio waves exceed the prescribed signal strength.

In the embodiment, when the terminal device 10 receives radio waves having a signal strength greater than or equal to the prescribed value, the terminal device 10 acquires wireless configuration data from the access point for identifying the access point. The terminal device 10 acquires wireless configuration data for all identified access points. The wireless configuration data more specifically includes a service set identifier (SSID) for identifying the access point. Note that a SSID is an identifier for access points using wireless communications according to one of the IEEE 802.11 standards.

Next, printers to which the terminal device 10 can issue print commands via the access points will be described. Similar to the relationships between terminal devices and access points described above, printers communicate with access points via a wired network interface (not shown) built into the printers themselves. As will be described later, the control unit 20 in the terminal device 10 according to the embodiment searches for printers that the control unit 20 can control via access points, and identifies printers that can communicate with access points by.

The terminal device 10 can communicate with an access point wirelessly when the signal strength of radio waves emitted from the access point is at least the prescribed value. In the example of FIGS. 2(A) and 2(B), the terminal device 10 located at position B belongs to a common area shared by both a region in which the signal strength of radio waves outputted from the first access point 100 exceeds the prescribed value (a first access point accessible region), and a region in which the signal strength of radio waves outputted from a second access point 200 exceeds the prescribed value (a second access point accessible region). Therefore, when present at position B, the terminal device 10 can perform wireless communications with either the first access point 100 or the second access point 200. At position E, the terminal device 10 belongs to a region in which the signal strength of radio waves outputted from a third access point 300 exceeds the prescribed value (a third access point accessible region). Hence, when located at position E, the terminal device 10 can perform wireless communications with the third access point 300.

As described above, the terminal device 10 can identify printers that are capable of receiving print commands from the terminal device 10 via the access points. Accordingly, when present at position B in FIG. 2(A), the terminal device 10 can issue a print command to any of the first printer 1100, the second printer 1200, and the third printer 1300 via the first access point 100. In addition, the terminal device 10 can issue a print command to any of the first printer 1100, the second printer 1200, and the third printer 1300 via the second access point 200.

A-1-3. Data Stored in the Record Table

Next, the print history data 42a and configuration data 42b stored in the record table 42 will be described. FIG. 3 shows an example of the print history data 42a stored in the record table 42.

The print history data 42a is updated each time a print command is issued. Each record of the print history data 42a indicates the printer to which the print command was issued, the access point used to transmit the print command, and the time and date that the command was issued.

For example, by accessing the print history data 42a shown in FIG. 3, the terminal device 10 can determine that a print command was issued to the first printer 1100 via the first access point 100 at 14:00 on Jan. 1, 2011.

Next, the configuration data 42b will be described. The configuration data 42b includes various data used by the control unit 20. As described above, the configuration data 42b includes wireless configuration data (the SSID and the like) related to access points identified when the terminal device 10 received, via the wireless network interface 63, radio waves having a prescribed signal strength or greater.

If the user has preset preferred access points, the terminal device 10 according to the embodiment stores wireless configuration data identifying the preset access points. However, if the user has not preset any access points, the terminal device 10 stores wireless configuration data identifying access points that are set in the access point determining process described in FIG. 4. As an example, preferred access point flags may be stored in the memory 40 in association with access points. The control unit 20 can identify preferred access points that have been preset by the user by determining whether the associated preferred access point flag is ON.

A-2. Access Point Setting Process

Next, the access point setting process executed by the terminal device 10 will be described. FIG. 4 is a flowchart illustrating steps in the access point setting process.

In S120 at the beginning of FIG. 4, the control unit 20 determines whether an access point has been preset as a preferred access point. For example, the control unit 20 may reference the preferred access point flag described above to determine whether an access point has been set as a preferred access point. If an access point has been preset (S120: YES), in S140 the control unit 20 determines whether it is possible to use this access point. More specifically, the control unit 20 determines whether radio waves received from the access point have at least a prescribed signal strength. If the control unit 20 determines that the access point can be used (S140: YES), the control unit 20 connects to the access point and ends the access point setting process of FIG. 4.

On the other hand, if an access point has not been preset (S120: NO), or if the negative determination is made in S140, in S160 the control unit 20 references the print history data 42a stored in the memory 40 and determines whether the print history data 42a includes at least one record of history data. If the print history data 42a does not include any history data (S160: NO), in S340 the control unit 20 executes a history void mode process described later to set the access point. In S360 the control unit 20 stores data in the print history data 42a correlating the access point set in S340 to the printers to which a print command can be issued via this access point. Subsequently, the control unit 20 ends the access point setting process of FIG. 4. Here, the control unit 20 may also prompt the user to input data required for connecting to the access point (an encryption method, for example). In this case, the control unit 20 stores the user inputted data in the memory 40 as the configuration data 42b.

However, if the print history data 42a includes at least one record of history data (S160: YES), in S200 the control unit 20 determines whether there exists an access point in the history data that emits radio waves having the prescribed signal strength or greater. That is, the control unit 20 identifies the strength of the radio waves from the access point received at the current position of the target device 10, and determines whether the strength is greater than or equal to the prescribed signal strength. If the control unit 20 determines that there exists no access point having a signal strength greater than or equal to the prescribed value (S200: NO), in S340 the control unit 20 executes the history void mode process described later to set the access point. Subsequently, the control unit 20 executes the process in S360 described above.

On the other hand, if the control unit 20 determines that there is at least one access point in the history data that produces a signal strength greater than or equal to the prescribed value (S200: YES), then in S220 the control unit 20 references the print history data 42a and identifies and extracts all printers that have been issued a print command via the access points found to have a signal strength of the prescribed level or greater.

Next, the method of identifying printers to which a print command have been issued will be described in greater detail for the situation in which the terminal device 10 is present at position B. As shown in FIGS. 2(A) and 2(B), the terminal device 10 located at position B can perform wireless communications with both the first access point 100 and the second access point 200. The control unit 20 references the print history data 42a (FIG. 3) to identify printers capable of receiving a print command from the terminal device 10 via each accessible access point. In this example, the control unit 20 can identify the first printer 1100, the second printer 1200, and the third printer 1300 as printers capable of receiving a print command via the first access point 100 and can similarly identify the same printers as printers capable of receiving a print command via the second access point 200, in this way, the control unit 20 can acquire data from each access point indicating which printers can be issued print commands from the individual access points.

The control unit 20 also references the print history data 42a to identify which printers were previously issued print commands and which access points were used to relay the print commands to the individual printers. As shown in FIG. 3, the control unit 20 previously issued print commands via the first access point 100 to the first printer 1100 and the second printer 1200 and via the second access point 200 to the first printer 1100, the second printer 1200, and the third printer 1300.

Figure 5:
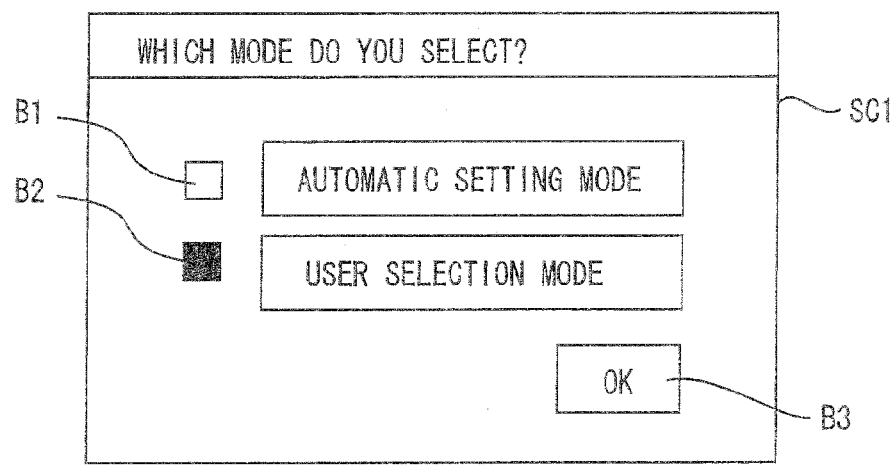
FIG. 5 is an explanatory diagram illustrating a selection screen to select access print mode.

As described above, in S220 the control unit 20 can identify all printers to which a print command was previously issued through each of the access points determined to have a signal strength greater than or equal to the prescribed value. After determining the printers, the control unit 20 displays a selection screen SC1 on the display unit 61 and prompts the user to select a preferred access point mode, as shown in FIG. 5. In the embodiment, the selection screen SC1 includes a radio button B1 used to select an automatic setting mode in which the control unit 20 sets the printer to be used, a radio button B2 used to select a user selection mode in which the user selects the printer to be used, and an OK button B3 for accepting the currently selected mode. In S240 the control unit 20 detects when the OK button B3 has been selected after one of the radio buttons B1 and B2 was selected and determines which mode is selected between the automatic setting mode and the user selection mode.

If the control unit 20 detects that the user selected the automatic setting mode (S240: automatic setting mode), in S260 the control unit 20 executes an automatic setting mode process described later. Subsequently, in S360 the control unit 20 stores data in the print history data 42a indicating the access point set in S260 and the printers to which print commands were issued via this access point, and subsequently ends the access point setting process of FIG. 4. As described earlier, the control unit 20 stores user-inputted data (an encryption method and the like) in the memory 40 as the configuration data 42b.

Figure 6A:
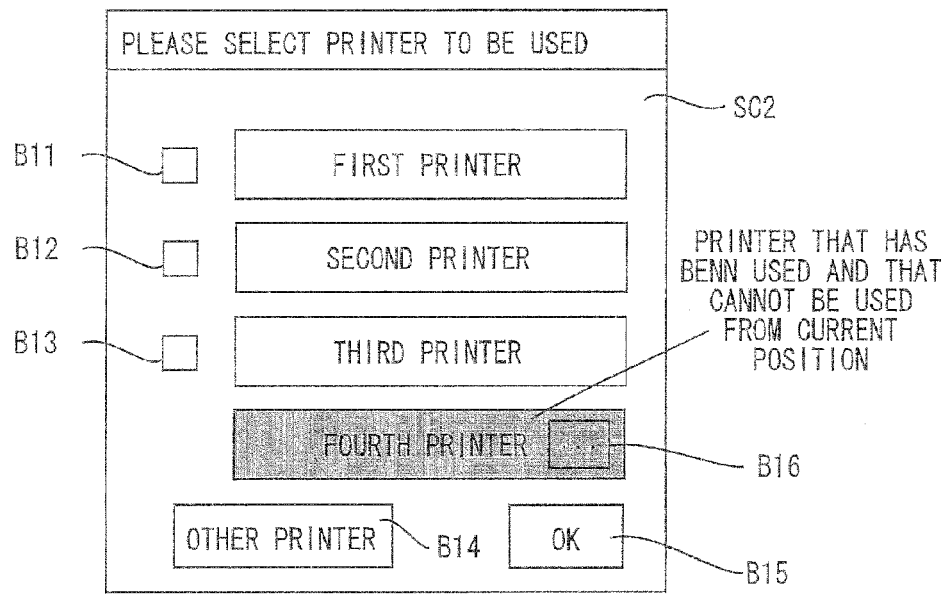
FIGS. 6(A) and 6(*b*) are an explanatory diagram illustrating printer selection screens.

However, if the control unit 20 detects that the user selected the user selection mode (S240: user selection mode), in S280 the control unit 20 displays a printer selection screen SC2 on the display unit 61 that includes a list of all printers extracted in S220, as shown in FIG. 6(A). In the embodiment, the printer selection screen SC2 includes radio buttons B11-B13 used to specify a desired printer, an other printer button B14 used to select a printer other than those displayed, and an OK button B15 for accepting the printer selected in the screen.

The number of radio buttons displayed on the printer selection screen SC2 for specifying a desired printer is equivalent to the number of printers that can be selected. Printers included in the printer selection screen SC2 that do not meet the following condition are grayed out in the display, as in the example of a fourth printer 1400. That is, printers in the print history data 42a that cannot be used from the current position of the terminal device 10 (i.e., printers that cannot receive a print command via an access point that has a signal strength greater than or equal to the prescribed value) are grayed out in the display. By graying out printers in this way, the user can easily differentiate those printers that the terminal device 10 can use to print and those that the terminal device 10 cannot use.

Figure 6B:
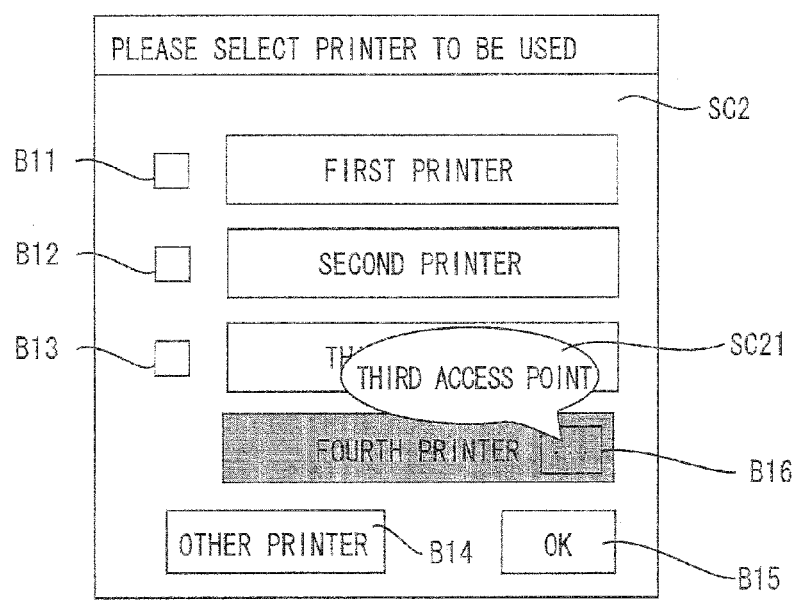

The printer selection screen SC2 also includes a confirmation button B16 displayed next to the printer to which the terminal device 10 cannot issue a print command from its current location for confirming the access point through which a print command was previously transmitted. FIG. 6(B) shows the screen displayed when the confirmation button B16 is selected. When the user selects the confirmation button B16, the control unit 20 references the print history data 42a to determine the access point through which a print command was previously issued (the third access point 300 in this example) for the printer that has been grayed out (the fourth printer 1400 in this example) and displays a screen SC21 including this data over the printer selection screen SC2. Through this display, the user can learn the access point to which the terminal device 10 was previously connected to use the grayed-out printer.

Note that other display configurations may be used in place of the above configuration of displaying the screen SC21 when the user selects the confirmation button B16. For example, rather than displaying a separate screen specifying the access point through which a print command was issued to the grayed-out printer, the access point may be displayed in the printer selection screen SC2 near the display position of the grayed-out printer. In this case, the confirmation button B16 is not displayed in the printer selection screen SC2, but the grayed-out printer and the access point used to relay a print command to this printer are displayed next to each other. Alternatively, the screen SC21 may be displayed in place of the printer selection screen SC2 when the user selects the confirmation button B16.

When the control unit 20 detects in S300 that the user has specified a desired printer from the printer list (i.e., when the control unit 20 detects that the OK button B15 in the printer selection screen SC2 was selected; S300: YES), in S320 the control unit 20 executes a user selection mode process described later. In S360 the control unit 20 stores data in the print history data 42a indicating the access point set in S320 and the printers to which a print command can be issued via this access point, and subsequently ends the access point setting process of FIG. 4. As described earlier, the control unit 20 stores user-inputted data (an encryption method and the like) in the memory 40 as the configuration data 42b.

On the other hand, if the control unit 20 detects that the user has specified a desire to use a printer other than the printers displayed in the list (i.e., if the control unit 20 detects that the other printer button B14 was selected in the printer selection screen SC2; S300: NO), in S340 the control unit 20 executes the history void mode process described later. In S360 the control unit 20 then stores data in the print history data 42a indicating the access point set in S340 and the printers to which a print command can be issued via this access point, and subsequently ends the access point setting process of FIG. 4. As described earlier, the control unit 20 also stores user-inputted data (an encryption method and the like) in the memory 40 as the configuration data 42b.

A-2-1. Automatic Setting Mode

Next, the automatic setting made process of S260 will be described with reference to FIG. 7. FIG. 7 is a flowchart illustrating steps in the process. The control unit 20 executes the automatic setting mode after determining in S240 that the user selected the automatic setting mode. More specifically, when the selection screen SC1 shown in FIG. 5 is displayed on the display unit 61 and the user is prompted to select an access point mode (one of the automatic setting mode and the user selection mode), the control unit 20 executes the automatic setting mode process if the user selects the radio button B1 specifying the automatic setting mode and subsequently selects the OK button B3 to accept this selection.

After confirming that the OK button B3 was selected, in S262 the control unit 20 references the print history data 42a to identify the printer to which the terminal device 10 most recently issued a print command. That is, the control unit 20 identifies the printer to which the terminal device 10 most recently issued a print command from among the printers extracted in S220 (i.e., printers that were issued a print command and that can receive a command via access points having a signal strength of the prescribed value or greater). In the example shown in FIG. 8, the third printer 1300 is identified as the printer included in the print history data 42a that was most recently issued a print command by the terminal device 10 and that can receive a print command from position B via either the first access point 100 or the second access point 200. Accordingly, the control unit 20 determines that the terminal device 10 will issue a print command to the third printer 1300.

In S264 the control unit 20 identifies the access point that was most recently used to issue a print command to the printer identified in S262. In the example of FIG. 8, the second access point 200 is identified as the access point most recently used by the terminal device 10 at position B to relay a print command to the third printer 1300. In S266 the control unit 20 connects to the access point identified in S264 by referencing and using the configuration data 42b recorded in the record table 42 stored in the memory 40, and subsequently ends the automatic setting mode process of FIG. 7.

Thus, when the user selects the automatic setting mode to have the control unit 20 set the access point in the automatic setting mode process, the control unit 20 selects the access point used for the printer to which a print command was most recently issued. By selecting the access point corresponding to the most recently used printer in this way, the control unit 20 can use an access point for which the terminal device 10 likely stores wireless configuration data (the user inputted encryption method and the like), thereby reducing the number of times that the user must input wireless configuration data.

Note that the printer that most recently issued a print command is the last printer to which the terminal device 10 issued a print command from among printers that performed printing operations before the terminal device 10 began executing the access point setting process of FIG. 4.

A-2-2. User Selection Mode Process

Next, the user selection mode process of S320 will be described with reference to FIG. 9. FIG. 9 is a flowchart illustrating steps in the process. The control unit 20 executes the user selection mode process when the control unit 20 detects in S240 that the user has selected the user selection mode and detects in S300 that the user has specified a desired printer from the displayed printer list (i.e., when the user selected the OK button B15 in the printer selection screen SC2 shown in FIG. 6(A)).

When the user selected the OK button B15, in S322 the control unit 20 identifies the printer selected by the user in the printer selection screen SC2. If the user selected the radio button B12 and then selected the OK button B15, as in the example shown in FIG. 10(A), the control unit 20 determines that the user has selected the second printer 1200.

After identifying the user-selected printer, in S324 the control unit 20 identifies the access point used to send the most recent print command to the selected printer. That is, the control unit 20 references the print history data 42a to identify the access point that the terminal device 10 most recently used to issue a print command to the second printer 1200. Thus, when the control unit 20 determines that the user selected the second printer 1200, the control unit 20 references the print history data 42a and identifies both the first access point 100 and the second access point 200 as access points used for issuing print commands to the second printer 1200, as shown in the example of FIG. 10(B). Subsequently, the control unit 20 references the time and date for the last print stored in association with the first access point 100 and the second access point 200 and determines that the second access point 200 was used most recently.

In S326 the control unit 20 connects to the access point identified in S324 (the second access point 200 in the example of FIG. 10(B)) and subsequently ends the user selection mode process of FIG. 9.

A-2-3. History Void Mode Process

Next, the history void mode process of S340 will be described with reference to FIG. 11. FIG. 11 is a flowchart illustrating steps in the process. The control unit 20 executes the history void mode process when determining in S160 that the record table 42 stored in the memory 40 does not include any print history data 42a (S160: NO), or when determining in S200 that none of the access points included in the print history data 42a have a signal strength greater than or equal to the prescribed value (S200: NO), or when detecting in S300 that the user specified a printer other than the printers included in the print history data 42a (i.e., when detecting that the user selected the other printer button B14 in the printer selection screen SC2 shown in FIG. 6(A); S300: NO).

In S342 the control unit 20 identifies the signal strength of radio waves received by the wireless network interface 63 and identifies access points that the terminal device 10 can connect to from the current location. In other words, the control unit 20 determines whether the radio waves from the access point received at the current position of the terminal device 10 have the prescribed signal strength or greater. Once the accessible access points are identified, in S344 the control unit 20 identifies printers that can be accessed via the access points by receiving data from the access points indicating printers to which the access points can relay print commands. When the terminal device 10 is located at position B, for example, the control unit 20 determines that print commands can be issued to the first printer 1100, the second printer 1200, and the third printer 1300 via both the first access point 100 and the second access point 200, as indicated in FIG. 12(A). In S346 the control unit 20 displays a printer selection screen SC3 listing the printers identified in S344 on the display unit 61, as shown in FIG. 12(B). The print selection screen SC3 displays radio buttons and an OK button B24. The user selects one of the radio buttons B21-B23 indicating the desired printer and confirms the selection by selecting an OK button B24. In S348, the control unit 20 determines whether the user selects one of the identified printers by selecting one of the radio buttons B21-23 and selecting the OK button B24.

When the control unit 20 determines that the user has selected one of the displayed printers (i.e., when the control unit 20 determines that the OK button B24 was selected; S348: YES), in S350 the control unit 20 identifies the access point having the strongest signal strength from among all access points through which the selected printer can be accessed. In this example, the control unit 20 determines which of the signals received from the first access point 100 and the second access point 200 is the strongest. In S352 the control unit 20 connects to the access point identified in S350 and subsequently ends the history void mode process of FIG. 11.

B. Summary

As described above, the terminal device 10 has the wireless network interface 63 for receiving radio waves emitted from the access points and communicates wirelessly with access points in order to issue print commands to printers via the access points. In addition, the terminal device 10 stores the print history data 42a correlating access points and the printers that can be accessed via the access points in the record table 42 of the memory 40. The terminal device 10 determines with which access point to communicate wirelessly based on the following conditions: (1) the strength of the signal received from the access point by the wireless network interface 63 must be greater than or equal to a prescribed strength; (2) the access point must be included in the print history data 42a; and (3) the terminal device 10 must have used this access point the last time a print command was issued to the specified printer. In this way, the terminal device 10 can connect to a suitable access point.

While the invention has been described in detail with reference to the embodiment thereof, it would be apparent to those skilled in the art that various changes and modifications may be made therein without departing from the scope of the invention.

(1) While the embodiment described above covers the case in which the terminal device 10 issues print commands to printers, the present invention may be applied to cases in which the terminal device 10 issues commands for other image processes. For example, the terminal device 10 may transmit a command to a printer via an access point to execute a scanning operation.

(2) In the embodiment described above, the terminal device 10 displays the printer selection screen SC2 and prompts the user to select a printer, but a different method may be used. For example, the print history data 42a may store at least one of (a) the number of print jobs and (b) the number of printed pages that the user previously requested to be printed on each printer, and the control unit 20 may select a printer for executing a print job based on this data.

Alternatively, at least one of (a) the number of print jobs and (b) the number of printed pages may be displayed together with the printer selection screen SC2 when prompting the user to select a printer. This configuration facilitates the user in selecting a desired printer because the user can readily see the usage frequency for each printer.

(3) In order to perform wireless communications with an access point set in one of the (a) history void mode process of S340, (b) automatic setting mode process of S260, and (c) user selection mode process of S320 in the embodiment, the user is prompted to input required information (encryption method, for example) for connecting to the specified access point, and the control unit 20 stores the user-inputted information in the memory 40 (specifically, the configuration data 42b). Here, information may be stored in the memory 40 for a plurality of access points or may be overwritten each time a new access point is set.

(4) In the embodiment described above, the control unit 20 identifies printers that are accessible from an access point by searching for printers that can receive a print command via the access point. However, the control unit 20 may instead identify printers capable of receiving a print command by determining whether the printers are in a ready state; for example, whether the printers are turned on.

(5) In the embodiment described above, when an access point has been set, the control unit 20 identifies the printers that can communicate with the access point by searching for printers capable of receiving a print command via the access point. However, the control unit 20 may store data in the memory 40 indicating printers identified from the access point in question and may identify printers capable of communicating with the access point using this data.

(6) While the access points are connected to printers by cables in the example of the embodiment shown in FIG. 2(S), these connections may be wireless instead.

What is claimed is:

1. A terminal device comprising:
   a communication unit comprising hardware configured to wirelessly communicate with a plurality of access points;
   a storing unit storing a history table including access-point information, printer information, and time information in a correlated manner, the access-point information indicating a connected access point through which the communication unit has sent an instruction to a printer, the printer information indicating the printer to which the communication unit has sent the instruction through the connected access point, the time information indicating a time at which the communication unit has sent the instruction to the printer through the connected access point;
   a processor; and
   a memory storing computer readable instructions that, when executed by the processor, cause the terminal device to perform:
   identifying, from among the plurality of access points, at least one accessible access point from which the communication unit is currently capable of receiving an outputted signal;
   identifying, as a target access point, one of the at least one accessible access point through which the communication unit most recently has sent the instruction to the printer, identification of the target access point being made on a basis of the history table;
   connecting to the target access point via the communication unit; and
   sending, through the target access point by using the communication unit, an instruction to the printer that is indicated by the printer information correlated to the access-point information indicating the target access point in the history table;
   wherein the history table includes a plurality of sets of access-point information, a plurality of sets of printer information, and a plurality of sets of time information, each of the plurality of sets of access-point information being correlated to one of the plurality of sets of printer information and one of the plurality of sets of time information in the history table, the each of the plurality of sets of access-point information indicating a connected access point through which the communication unit has sent an instruction to a printer, the one of the plurality of sets of printer information indicating the printer to which the communication unit has sent the instruction through the connected access point indicated by the each of the plurality of sets of access-point information, the one of the plurality of sets of time information indicating a time at which the communication unit has sent the instruction to the printer indicated by the one of the plurality of sets of printer information through the connected access point indicated by the each of the plurality of sets of access-point information,
   wherein the identifying identifies the target access point through which the communication unit most recently has sent the instruction to the printer from among the at least one accessible access point on a basis of the plurality of sets of access-point information, the plurality of sets of printer information, and the plurality of sets of time information in the history table.

2. The terminal device according to claim 1, wherein the computer readable instructions that, when executed by the processor, cause the terminal device to perform:
   displaying, on a screen, first information of the printer to which the communication unit is capable of sending the instruction through the one of the at least one accessible access point;
   receiving a selection instruction to select one of the at least one printer displayed in the first display information, and identifying the one of the at least one printer based on the selection instruction as the target printer.

3. The terminal device according to claim 2, wherein the identifying identifies a currently inaccessible printer that each of the at least one accessible access point is currently incapable of accessing,
   wherein the displaying second display information indicates that the communication unit is incapable of sending the instruction to the currently inaccessible printer through each of the at least one accessible access point.

4. The terminal device according to claim 3, wherein the history table includes specific access-point information indicating a specific access point through which the communication unit has previously sent an instruction to the currently inaccessible printer and the printer information indicating the currently inaccessible printer being correlated to the specific access-point information,
   wherein the second display information includes a confirmation button,
   wherein the computer readable instructions that, when executed by the processor, cause the terminal device to perform displaying, together with the second information, third display information to specify the access point through which the communication unit has previously sent the instruction to the currently inaccessible printer on a basis of the specific access-point information included in the history table when the confirmation button is pressed.

5. The terminal device according to claim 4, wherein the displaying displays the second information and the third information such that at least part of the third information is overlapped with the second information.

6. The terminal device according to claim 1, wherein the computer readable instructions that, when executed by the processor, cause the terminal device to perform:
specifying a strength of a signal outputted from each of the at least one accessible access point,
identifying, as the target access point, an access point having a strongest strength of the signal from among the at least one accessible access point when the history table fails to include the printer information.

7. The terminal device according to claim 6, wherein the computer readable instructions that, when executed by the processor, cause the terminal device to perform:
specifying a strength of a signal outputted from each of the at least one accessible access point;
receiving a requirement to use a designated printer other than any printer whose printer information is included in the history table; and
identifying, as the target access point, the access point that has a strongest strength of the signal from among the at least one accessible access point that is capable of transmitting the instruction to the designated printer when the receiving receives the requirement.

8. The terminal device according to claim 1, wherein the plurality of access points includes a first access point and a second access point, both the first access point and the second access point being capable of transmitting the instruction to the printer,
wherein the history table includes: first access-point information, first printer information, first time information, second access-point information, second printer information, and second time information, the first access-point information being correlated to the first printer information and the first time information, the first access-point information indicating the first access point, the first printer information indicating the printer to which the communication unit has sent the instruction through the first access point, the first time information indicating a time at which the communication unit has sent the instruction to the printer through the first access point,
the second access-point information being correlated to the second printer information and the second time information, the second access-point information indicating the second access point, the second printer information indicating the printer to which the communication unit has sent the instruction through the second access point, the second time information indicating a time at which the communication unit has sent the instruction to the printer through the second access point,
wherein the identifying identifies, from among the first access point and the second access point, the target access point through which the communication unit most recently has sent the instruction to the printer on a basis of the first access-point information, the first printer information, the first time information, the second access-point information, the second printer information, and the second time information.

9. The terminal device according to claim 1, wherein the time information includes information of a time and date at which the communication unit has sent the instruction to the one printer through the connected access point.

10. The terminal device according to claim 1, wherein the instructions instruct the printer to perform a printing operation.

11. A non-transitory computer readable storage medium storing a set of program instructions installed on and executed by a computer having a communication unit comprising hardware configured to wirelessly communicate with a plurality of access points, and a storing unit storing a history table including access-point information, printer information, and time information in a correlated manner, the access-point information indicating a connected access point through which the communication unit has sent an instruction to a printer, the printer information indicating the printer to which the communication unit has sent the instruction through the connected access point, the time information indicating a time at which the communication unit has sent the information to the printer through the connected access point,
the program instructions comprising:
identifying, from among the plurality of access points, at least one accessible access point from which the communication unit is currently capable of receiving an outputted signal;
identifying, as a target access point, one of the at least one accessible access point through which the communication unit most recently has sent the instruction to the printer, identification of the target access point being made by referring to the history table;
connecting to the target access point via the communication unit; and
sending, through the target access point by using the communication unit, an instruction to the printer indicated by the printer information correlated to the access-point information indicating the target access point in the history table;
wherein the history table includes a plurality of sets of access-point information, a plurality of sets of printer information, and a plurality of sets of time information, each of the plurality of sets of access-point information being correlated to one of the plurality of sets of printer information and one of the plurality of sets of time information in the history table, the each of the plurality of sets of access-point information indicating a connected access point through which the communication unit has sent an instruction to a printer, the one of the plurality of sets of printer information indicating the printer to which the communication unit has sent the instruction through the connected access point indicated by the each of the plurality of sets of access-point information, the one of the plurality of sets of time information indicating a time at which the communication unit has sent the instruction to the printer indicated by the one of the plurality of sets of printer information through the connected access point indicated by the each of the plurality of sets of access-point information,
wherein the identifying identifies the target access point through which the communication unit most recently has sent the instruction to the printer from among the at least one accessible access point on a basis of the plurality of sets of access-point information, the plurality of sets of printer information, and the plurality of sets of time information in the history table.

* * * * *